United States Patent
Gross et al.

[11] 3,824,375
[45] July 16, 1974

[54] MEMORY SYSTEM
[75] Inventors: Wilmer Gross, Philadelphia; Edwin S. Wydro, Levittown, both of Pa.; Charles W. Wood, Cherry Hill, N.J.
[73] Assignee: Financial Security Systems, Inc., Philadelphia, Pa.
[22] Filed: Aug. 28, 1970
[21] Appl. No.: 67,717

[52] U.S. Cl.......................... 235/61.7 B, 340/173 R
[51] Int. Cl. ............................................. G06k 7/00
[58] Field of Search...... 340/173 R, 174.1 C, 146.2; 235/61.7, 61.7 B

[56] References Cited
UNITED STATES PATENTS

| | | | |
|---|---|---|---|
| 3,344,258 | 9/1967 | Michels............................ | 340/146.2 |
| 3,375,507 | 3/1968 | Gleim........................... | 340/174.1 C |
| 3,601,805 | 8/1971 | Snook ............................. | 235/61.7 B |
| 3,655,947 | 4/1972 | Yamamoto..................... | 235/61.7 B |
| 3,657,702 | 4/1972 | Stephenson .................... | 235/61.7 B |
| 3,665,162 | 5/1972 | Yamamoto..................... | 235/61.7 B |
| 3,697,729 | 10/1972 | Edwards......................... | 235/61.7 B |

*Primary Examiner*—Terrell W. Fears
*Attorney, Agent, or Firm*—Seidel, Gonda and Goldhammer

[57] ABSTRACT

A memory system for simultaneously accessing a memory from a large number of sources includes a cyclic memory from which stored information is continuously read by a plurality of read means and temporarily entered into comparison registers, input registers receive and temporarily store at least one of the coded digits on said memory, and comparators generate a signal upon the existence of a coincidence between a coded digit momentarily in said comparator register and a coded digit temporarily stored in said input register. The existence of such coincidence is used to trigger arithmetic and logic units for further processing of the information.

30 Claims, 4 Drawing Figures

MEMORY SYSTEM

This invention relates to a memory system. More particularly, this invention relates to a memory system that can be simultaneously accessed in parallel.

There is currently a large need for memory systems which can simultaneously store relatively large amounts of data, can be quickly accessed, and perform simple arithemetic functions. A system for checking the validity of credit cards is one example of a memory system which has such requirements. Such a system must store a large amount of credit card numbers and a relatively small amount of information concerning each credit card, such as its validity and the balance in the account. A memory system which has similar requirements is a bank checking account. Still another example of such a system would be security identification cards which are subject to being stolen or lost, as are credit cards.

Validity checking systems which perform functions such as described above are known in the art. For example see U.S. Pat. No. 3,465,289 issued Sept. 2, 1969. The systems described in this patent and others like it incorporate remote data units electronically connected to a central processor and memory. The remote data units read credit cards or otherwise insert credit card numbers which are transmitted to the central processing unit as described in the aforesaid patent. Such systems have more than enough capacity for storing the data being used and are quite capable of performing the functions required for processing individual account numbers. Despite their capability, such systems have certain very serious drawbacks. The major drawback of such systems is the inability to access the memory except in a sequential manner. Thus, for example, all such units are buffers and other delay devices for sequentially processing data as it is referred in from remote data units. As a result, access to the computer memory is greatly delayed, even as much as several minutes. When operating a validity checking system for checking the status of a bank account or a credit card, such delays make the system impractical since customers and users will not tolerate them.

It therefore is an object of the present invention to provide a memory system which can be immediately accessed by any number remote data units or other devices seeking to communicate with the computer memory. Stated otherwise, it is an object of the present invention to provide a memory system wherein multiparalleled access to the memory device is possible.

Such a system has several advantages. In the first instance it solves the problem of processing a large number of messages being communicated to the memory while at the same time retaining the large storage capabilities and relatively small processing capabilities mentioned above. Another advantage of the memory system described herein is that it completely eliminates the need for using a large and cumbersome central data processing unit. In its place, a large memory device with a minimum amount of hardware in the form of arithmetic and other logic units is provided. The system provided, as hereinafter described, therefore meets the requisites of large capacity, low cost, high speed, and is highly reliable.

As previously indicated, in the area of simple business transactions, the problem normally is the storage of a large amount of data which requires relatively simple arithmetic processing; e.g., add, subtract, multiply by predetermined numbers. Such a system requires a large capacity memory, but only a relatively small arithmetic and logic unit. More importantly, such a system requires some means whereby the information stored on the memory can be rapidly accessed by a large number of sources seeking to use such information, such as remote terminals checking the validity of credit cards or otherwise making entries into customer accounts. Large capacity memories and relatively small arithmetic and logic units are readily available. The problem of access to the memory is really one of time. Conventional computer technology calls for the use of an address for the information. In other words, the information is found by searching the memory for the address. In accordance with the present invention the information itself is used as the address to reduce access time. For example, the memory may store a large number of customer account numbers and other information relating to the account such as the dollar balance. In this case, the account number can provide the address for finding the information concerning the account.

The foregoing computer memory searching scheme is accomplished by continuously running the information concerning each account, including the account number, through a closed loop. The loop may include a memory read device and temporary store device such as a shift register. The coded numbers momentarily stored in the shift register are compared with account numbers entered from remote sources into an input temporary store device. If coincidence is found to exist, a start pulse initiates additional logic and arithmetic processing results in a check of the validity in the account number and modification of the status of the account. Writing of the changes in status on the computer memory completes the loop.

The principal advantage of such a system is that it is unlimited as to the amount of remote devices which can be simultaneously accessed to the computer memory. This is made possible because the number of registers and comparators can be increased to any amount necessary to handle the maximum amount of remote terminals that are expected to communicate with the memory at any given time. Thus, parallel access to the memory is possible. The registers are connected to a common bus. The information is entered into the registers only long enough for the comparator to determine the existence of coincidence with an input register. Once coincidence is determined, the information can be removed from the register or transferred partially or wholly to another register. Thus, the memory is continuously read and parallel access is made possible.

Using the foregoing concepts, it is possible to add any number of comparators for rapid access to the computer memory. Such comparators can be added with no degradation or interference with the operation of the memory. Moreover, no synchronization is required. Moreover, the access to the memory is in parallel rather than sequential mode.

For the purpose of illustrating the invention, there is shown in the drawings a form which is presently preferred; it being understood, however, that this invention is not limited to the precise arrangements and instrumentalities shown.

Figure 1:
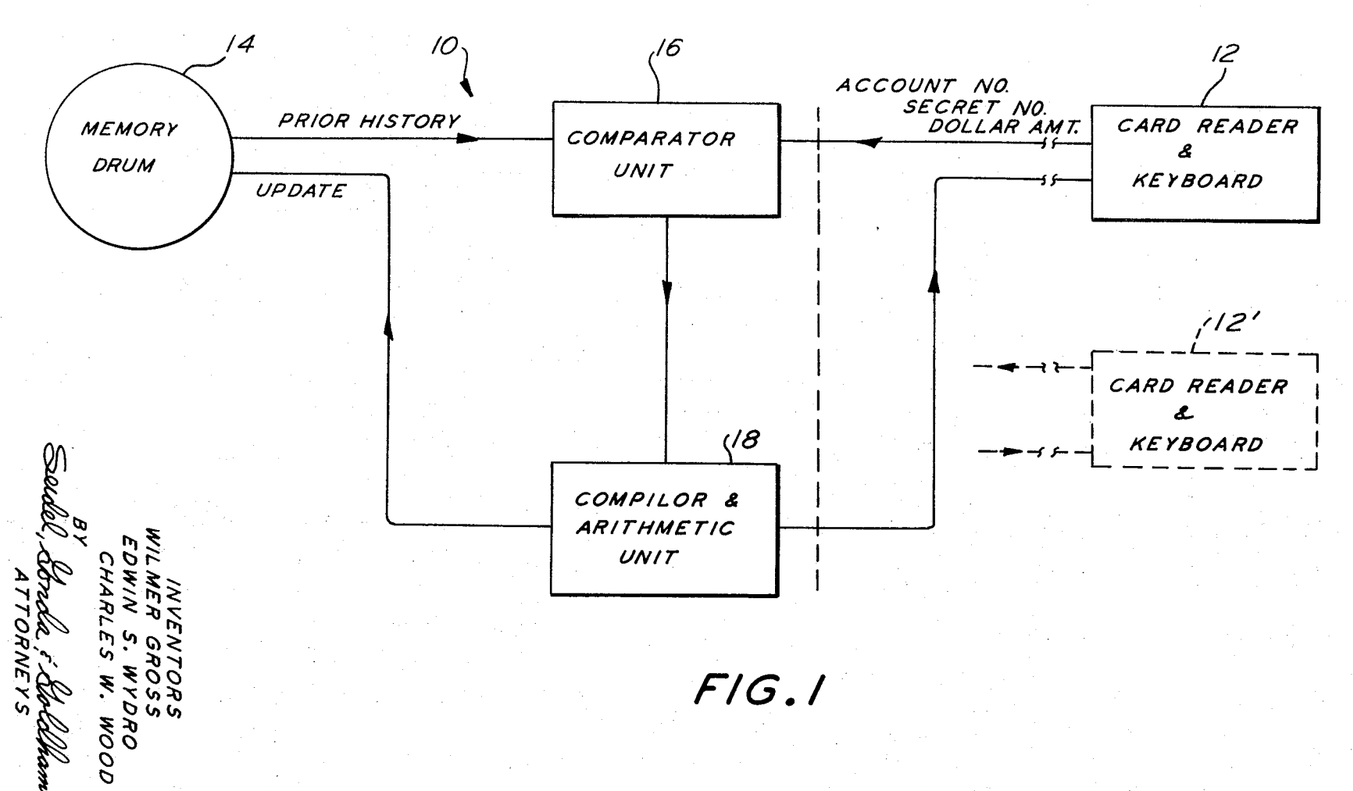
FIG. 1 is an elemental block diagram showing the flow of information through a system constructed in ac

Referring now to the drawing in detail, wherein like numerals indicate like elements, there is shown in FIG. 1 a block diagram illustrating how the principles of the present invention may be incorporated into a system for checking credit card validity. The memory system is designated generally as 10. While the present invention will be described in relation to a credit card validity checking system, those skilled in the art will recognize that it is not so limited. By way of example, but not limitation, the present invention can be used for most business systems where a large cache of information must be stored and rapid access to such information is required. In addition to credit card systems, there are bank systems wherein bank tellers at main and local branches can make inquiry of the status of a customer's account. The system can be used for inventory control, for payroll processing, as well as for transportation boarding and reservation systems.

As shown, the system 10 is connected to a card reader and keyboard 12 located at a remote terminal. The card reader and keyboard 12 may include any conventional device for inserting pertinent data into a communication system for transmittal to the memory system. The card reader 12 may, for example, include apparatus for magnetically or optically reading the credit card number previously inserted into the credit card. Of course, mechanical reading means may also be used.

A secret number, which is known only to the credit card holder and to the company issuing the credit is used to verify that the bearer of the credit card is the person or persons to whom the card has been validly issued. Since the secret number is not stored in the card, no one can know it except the proper person to whom the card has been issued.

Typically, the bearer presents the credit card to the seller or other issuer of credit who in turn inserts the card into the card reader and keyboard 12. Simultaneously, the bearer communicates to the issuer of credit the secret number (or other alphanumeric code) which is inserted into the system by depressing the appropriate keys in the keyboard. As explained subsequently, the secret number inserted into the system and communicated to the memory is compared with a secret number stored in the memory in association with the credit number. If the memory stored secret number and the inserted secret number coincide, then the card is known to be valid. If there is no coincidence, then this is at least an indication that there is a defect in the card which should be investigated. Typically, such defect may involve a lost or stolen credit card. This lack of correspondence is communicated from the memory to the keyboard in a manner described hereinafter.

Another function of the keyboard may be to insert the dollar amount of the sale for analysis to determine (a) whether or not the account will sustain such a sale without being overdrawn; (b) whether or not the account is already overdrawn; and (c) to debit the account upon completion of the transaction.

From the foregoing, it can be readily seen that the information inserted into the communication system consists of the account number, the secret number and the dollar amount in the example herein described. Of course, different information can be inserted into this communication system. For example, the secret number can be left out, or the information inserted into the communication system can consist of the account number or some other identifying number and the quantity of sale for inventory control.

The method of communicating the information inserted by the card reader and keyboard 12 to the memory system 10 may be any conventional communication system. For in house use, it can be hard wired. If desired, telephone utility communication systems can be used for more remote intercommunication. When using a telephone utility communication system, the card reader and keyboard can be adapted to automatically dial the telephone number assigned to the memory system 10. The telephone number of the memory system can be magnetically stored in the credit card or a similar device and read upon insertion into the card reader and keyboard 12. Thereafter, dialing the telephone number is accomplished by appropriate means.

Card readers and keyboards for use in verification and validity checking systems are known. See for example U.S. Pat. No. 3,465,289 issued Sept. 2, 1969; U.S. Pat. No. 3,513,441 issued May 19, 1970 and U.S. Pat. No. 3,514,754 issued May 26, 1970. Of course, other data entry devices as desired may be used. Accordingly, it is not necessary to describe in detail the specifics of the card reader and keyboard 12 since known devices may be used to perform the function of transmitting the account number, secret number and dollar amount, or other relevant information through a communication system to the memory system 10.

The memory system 10 includes a drum type memory 14 which may be referred to hereinafter as a cyclic memory. A drum type memory is chosen because of its capability of storing large amounts of information which may be rapidly read out. In addition to size, other advantages of the drum type memory is its relatively low cost, the speed at which it may be read and otherwise operated, and its reliability. Since it is a function of the memory system 10 to continuously run the information stored on the drum through what may be described as a closed information loop, a so-called cyclic memory is chosen. Of course, other types of cyclic memories such as a closed loop of magnetic tape may be used. However, such other memories as presently known in the art do not meet the aforesaid requisites of size, cost, speed, and reliability.

The memory system 10 further includes a comparator unit 16 whose function is to compare all information cyclically read out of the drum 14 with information communicated from the card reader and keyboard 12. In the example given, the information initially compared is the account number. If coincidence in account numbers is found, then further processing is initiated to determine coincidence between secret numbers within the comparator unit 16. Still further, operation of the compiler and arithmetic unit 18 can be triggered. The purpose of the compiler and arithmetic unit 18 is severalfold. It performs the arithmetic function which, may be subtraction of the amount of sale; it includes a logic unit which generates appropriate signals for transmission back to the card reader and keyboard; and it signals a write circuit to update the drum memory as required. The signals returned to the card reader and keyboard 12 are (1) an "Accept Signal" indicating completion of the transaction; (2) a "Refer Signal" indicating that the transaction cannot be accepted because of some deficiency in the account; and (3) a signal to indicate that there has been an "Identity Error" due to an incorrect secret number resulting in lack of coincidence between secret numbers as determined by the comparator unit.

Although only one card reader and keyboard 12 has been described, it should be recognized that the invention contemplates a multiplicity of such card readers and keyboards. This is indicated by the inclusion of the card reader and keyboard 12' which preferably is identical in structure to the card reader and keyboard 12.

Examination of FIG. 1 and in particular of the memory system 10 consisting of memory drum 14, comparator unit 16 and compiler and arithmetic unit 18 shows the loop concept of the system. Thus, information stored on the memory drum (designated "prior history") is continuously read from the drum memory 14 and inserted into the comparator unit 16. This information is compared with information constantly being communicated to the comparator unit by card reader and keyboard 12 through appropriate communication systems. When the comparator unit 16 finds coincidence, the compiler and arithmetic unit 18 is triggered. In addition to answering the particular card reader and keyboard 12, the compiler and arithmetic unit 18 prepare appropriate information for updating the memory drum 14, thereby completing the information loop.

The manner in which the comparator unit 16 and arithmetic unit 18 can be used to simultaneously handle any number of card reader and keyboards 12 at the same time is described hereinafter.

Figure 2A:
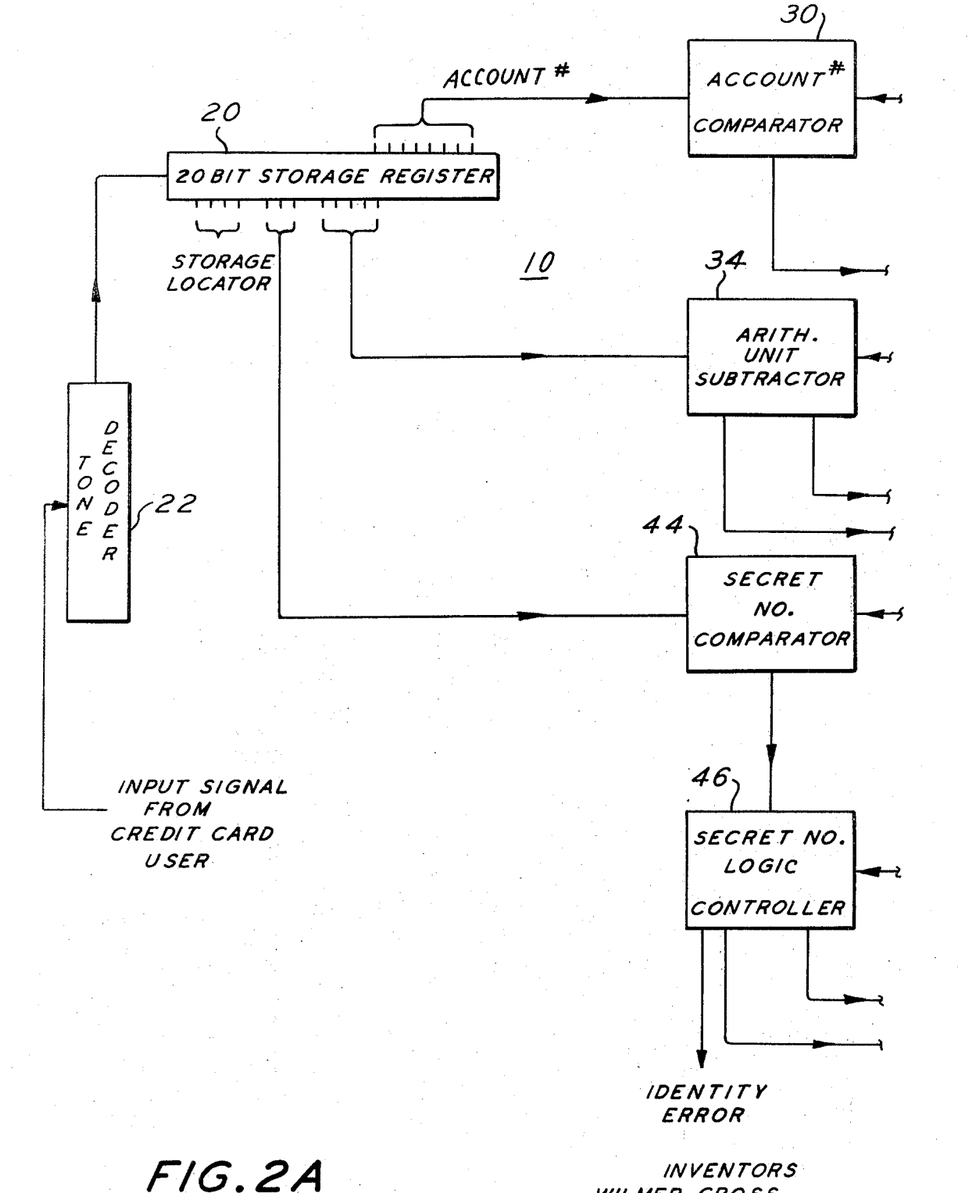
- FIGS. 2A and 2B are block diagrams showing the memory system of the present invention.
Figure 2B:
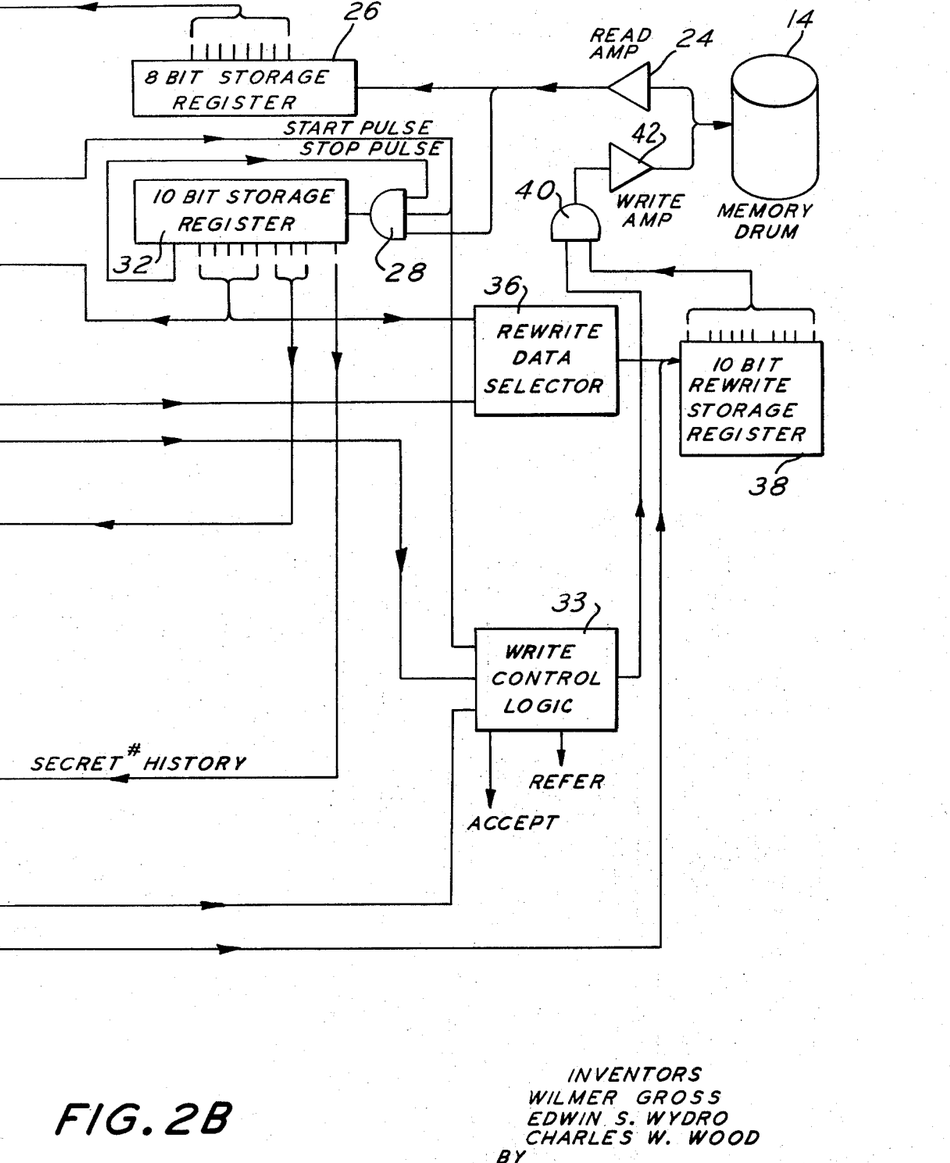

Referring now to FIG. 2, the operation of the memory system 10 is described in detail.

The memory drum 14 may be any conventional memory drum available for purchase on the open market. The primary factor in selecting the memory is the amount of information which is to be stored. For example, a typical memory 14 may comprise a memory drum capable of storing 71.6 million bits with 1,024 tracks and 1,024 read/write heads. Such a drum memory would also, of course, have appropriate clock tracks, segment tracks and index tracks as is conventional in memory technology.

The memory storage scheme in the embodiment herein described may be as follows:

| SPACE | ACCOUNT NO. | SPACE | ONES | SECRET NO. | AMOUNT | IDENTITY ERRORS |
|-------|-------------|-------|------|------------|--------|-----------------|

The number of bits assigned to the two spaces, the account number, ones, secret number, dollar amount and identity errors is variable depending upon the decimal digits to be stored in binary form on the drum memory 14. Moreover, the information can be stored on more than one track. For example, the information can be stored on four tracks for reading out any binary coded decimal, thusly: track No. 1 – $2^0$; track No. 2 – $2^1$; track No. 3 – $2^2$; and track No. 4 – $2^3$. Of course, eight, 16 or 32 tracks could be used as desired. The advantage of using more than one track is that the whole binary number can be looked at simultaneously. In addition, whole groups of binary numbers can be simultaneously looked at.

Those skilled in the art should recognize that the number of tracks used may in part be regulated by the amount of information stored on the drum. When filled to capacity, a drum of the size above takes approximately 35 seconds to read out all 71.6 million bits. This obviously is much too slow. By using four tracks the amount of time can be reduced down to approximately 8 seconds; 16 tracks reduce the reading time down to 4 seconds; and so forth. Of course, if the drum is not completely filled, the amount of time required to read out all of the information is still less. It should be pointed out that the foregoing examples of read out time assume a memory storage scheme such as is shown above and is approximately 72 bits wide.

Information from the card reader and keyboard 12 is inserted into the memory system 10 by entry into input store means 20. In the embodiment shown, store means 20 is a 20 bit shift register. However, serially connected 12 and eight bit registers can be used. As indicated, register 20 is of the serial in-parallel out type.

If a telephone communication system is used, it can incorporate any conventional means of data transmission. If it be the touch tone type, signals are received and decoded by the tone decoder 22 which may be a conventional decoder for decoding frequency tone signals in the standard two out of seven tone system used by the various Bell Telephone Companies. A different decoder would be used if communication is by some other means such as frequency shift keying (FSK) with a modem. The output of the tone decoder 22 is a binary signal that is fed in serial form to the 20 bit store register 20. If a four track system is used, then the binary output of decoder 22 consists of four signals representing $2^0$; $2^1$; $2^2$; and $2^3$ which are fed to four 20 bit store registers 20. The information entered into the store register 20 consists of the information transmitted from the card reader and keyboard 12. This information is the account number, the secret number, and the dollar amount of the transaction which may be a five digit number if limited to $999.99.

Information stored on the memory drum is cyclically read out through the read amplifier 24. This information, consisting of a coded form of the account number, ones, the secret number, the dollar amount, and the number of identity errors, is serially entered into the comparator storage means 26, consisting of a shift register, and to one terminal of the gate 28.

The information stored in store register 20, which may be referred to as an input register, consists of the account number, the amount of transaction, the secret number and other information such as a store locater to identify the particular card reader and keyboard 12. The first information entered into the input store register 20 consists of the account number. In a like manner, the first word of the message entered from the memory into the comparator storage register 26 consists of the account number. Both numbers are compared by the account number comparator 30 to determine the existence of coincidence. Coincidence circuits are well known in the computer art and therefore need not be described in detail. In accordance with the present invention, the account number temporarily stored in the input store register 20 is compared with every account number stored in the memory drum since such numbers are sequentially read out of the drum and applied to the comparator storage register 28. When the two numbers coincide, the account number comparator generates a start pulse which is transmitted to the gate 28 and to the write control logic 33. The start pulse permits the information in the rest of the message, consisting of the ones, the secret number, dollar amount and identity errors to be entered into the arithmetic and accumulator storage register 32. The space between the account number and the ones allow sufficient time for the start pulse to be applied to the gate 28. Since the account number per se is used merely to address the memory and locate the prior history of the account, it is not necessary to store this information in the arithmetic and accumulator storage register 32. Stated otherwise, the account number is used to address the memory but is otherwise irrelevant to the further processing of the information related to the account number.

Storage register 32 is a serial in - parallel out shift register. Once it has been loaded, the "ones" are fed back in the form of a stop pulse to the gate 28 thereby closing the gate and preventing the further entry of information read out by the memory drum.

From the foregoing, it can be seen that the information continuously fed into storage register 26 has been addressed by the information fed into the storage register 20 by finding coincidence between account numbers which form a part of the total message. Thereafter, the rest of the message is temporarily stored in an appropriate storage device such as storage register 32 for further arithmetic and logical processing.

The information stored on the arithmetic and accumulator register 32 is processed as follows:

The dollar amount in the account is transferred from the storage register 32 to the arithmetic unit 34 which in this described example is a subtractor. Of course, for other processes it could be a multiplier or an adder or any combination thereof. In dealing with credit cards, it is the function of a system to record the amount of permissible credit and indicate the balance of such credit available by subtracting the amount of each transaction in the form of a sale of goods or services until the memory is updated by means of a payment or some other credit. The arithmetic unit 34 in the form of a subtractor is well known in the art, and therefore it need not be described in detail. It is sufficient to state that it subtracts the amount derived from storage resgister 20 previously entered from the card reader and keyboard 12, from the amount entered into the storage register 32. The result of such function is entered into the rewrite data selector 36 and into the rewrite storage register 38. The amount entered into the storage register 38 is either a binary coded decimal if there is a remainder or a zero if there is no remainder. The no remainder condition indicates either that the account has been depleted by this particular transaction or that it has been closed by erasing the dollar amount from the drum memory. The condition of the remainder (positive or zero) is transmitted from the arithmetic unit 34 to the write control logic 33 as indicated. If there is a remainder, then the write control logic 33 is conditioned to generate a pulse which is applied to gate 40 for entering information stored in the register 38 through the write amplifier 42. The write control logic 33 does not turn on the gate 40 until certain other conditions described hereinafter are satisfied. If, however, the write control logic receives a signal from arithmetic unit 34 indicating that the balance is exhausted (i.e., a zero, then a refer signal is generated and transmitted over the answer line) to card reader and keyboard 12. This refer signal is communicated back through the telephone system to the card reader and keyboard 12 using appropriate encoders and decoders (not shown). Moreover, the existence of a zero balance will prevent the write control logic 33 from enabling the gate 40 to write information existing in the register 38 back into the memory drum 14.

The secret number, which may be three digits, is read out of the storage register 32 into the secret number comparator 44. Similarly, the secret number entered from the card reader and keyboard 12 is read out of the storage register 20 and entered into the secret number comparator 44. The secret number comparator 44 consists of a known comparison circuit which evaluates the value of each of its terminals to determine coincidence. If there is coincidence between the two secret numbers, then a signal is sent to the write control logic 33 to provide a further step in its function of enabling the gate 40.

To be memorized, a secret number must be relatively short; e.g., a three or four digit number can be used. However, there is no technical limits on its length. Obviously short secret numbers will be repeated in any system of appreciable size. There must be some means for preventing persons from determining the particular secret number simply by surreptitiously using the card reader in keyboard 12 for a sufficient number of times to determine the existence of the secret number. Thus, a person could merely punch out three digit numbers from 001 to 999 until an "accept" signal is received back from the write control logic. To prevent this, the system is provided with the means for preventing further use of the credit card after there have been three attempts to match secret numbers without success. This is accomplished in the following manner.

As previously indicated in the memory scheme, space is available for recording identity errors. Each time there is an identity error (i.e., lack of coincidence in the secret number comparator 44), then the secret number logic controller 46 generates a signal which is entered into the rewrite register 38 and ultimately recorded on the memory drum 14. The second time there is an identity error, a signal is again generated by the secret number logic controller 46. Moreover, the past history of identity errors is read out of the storage register 32 through the secret number logic controller 46 and entered into the rewrite register 38. This sequence of events occurs up to the prescribed limit; e.g., three. Once the limit of identity errors is reached, then the secret number logic controller generates a signal through the write control logic 33 which causes a refer logic condition to exist regardless of future use of the correct secret number.

As previously indicated, the write control logic 33 controls the gate 40. Write control logic 33 generates a pulse to open gate 40 only after it has received the appropriate signals from arithmetic unit 34 and the secret number logic controller 46. Still a further requirement is necessary for the write control logic 33 to open the gate 40. That is the generation of another start pulse by the account number comparator. This occurs when there is a second coincidence between the account number on input register 20 and the account number in input reigster 26. Stated otherwise, such coincidence will occur when the memory drum 14 makes a subsequent pass over the account number. At this point, the write control logic 33 has satisfied three necessary conditions at its input terminal and generates a pulse which is applied to the gate 40. This therefore permits the information stored in rewrite register 38 to be entered through write amplifier 42 onto the memory drum 14.

Still further, each time the secret number logic controller 46 receives an indication that there is a lack of coincidence at the input terminals for the secret number comparator 44, then an identity error signal is transmitted back through the communication system to the card reader and keyboard 12. If coincidence exists in the secret number comparator 44 and the remainder generated by the arithmetic unit 34 is positive, then the write control logic 33 generates an accept signal which is transmitted back to the card reader and keyboard 12 through the communication system.

Figure 3:
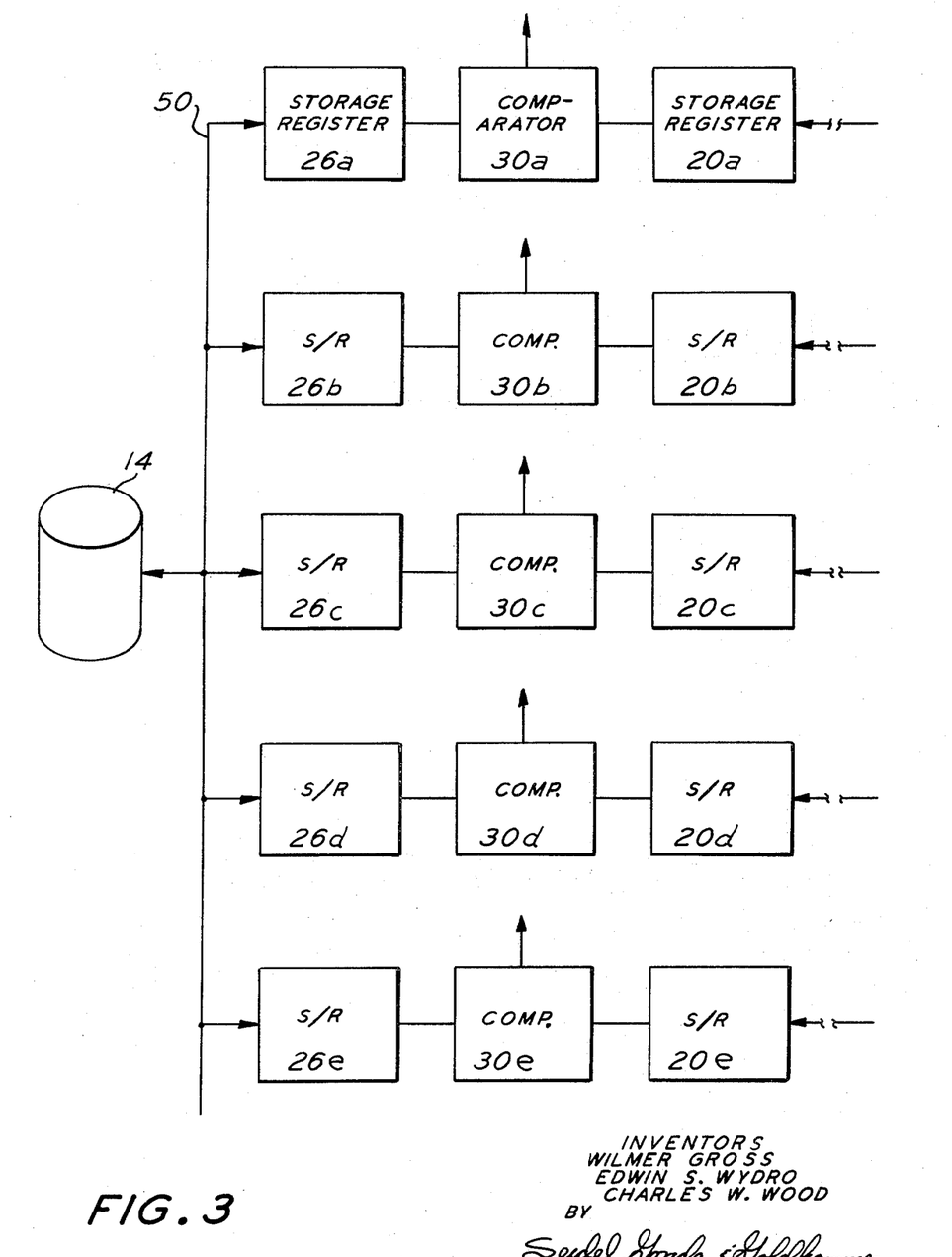
FIG. 3 is a block diagram showing the principles of the present invention.

Referring now to FIG. 3, there is shown a block diagram illustrating how access to the drum memory is unlimited. As shown, the read circuitry of the drum memory 14 constantly applies all of the information contained on the drum onto the buss 50, where it is continuously entered into comparator storage registers 26a, 26b, 26c, 26d, 26e and any other number of like registers which may be connected to the buss 50. The registers 26a–26e are identical to the register 26 described with respect to FIG. 2.

An account number comparator 30 is connected to each of the registers 26a–26e. Thus, an account number comparator 30a is connected to register 26a. In a like manner, account number comparators 30b, 30c, 30d and 30e are connected to equivalent registers 26b, 26c, 26d and 26e.

Data from remote card readers and keyboards 12 are entered into storage registers 20a, 20b, 20c, 20d and 20e, depending upon which is available at any particular point in time. Storage registers 20a through 20e are identical in function to storage register 20 described with respect to FIG. 2.

The number of comparator circuits 30 can be expanded up to almost any limit. The number depends only upon the maximum number of card readers and keyboards seeking to communicate with the memory 14 at any particular instance in time.

From the foregoing, it should be apparent that there has been provided a memory system which meets all of the objects set forth hereinbefore. In particular, the system is capable of providing simultaneous arithmetic functions for a large number of subscribers without delay.

The present invention may be embodied in other specific forms without departing from the spirit or essential attributes thereof and, accordingly, reference should be made to the appended claims, rather than to the foregoing specification as indicating the scope of the invention.

We claim:

1. A memory system, comprising:
    a cyclic memory means for storing information relating to a plurality of accounts, each account being assigned an account number or identification word comprised of a predetermined number of decimal digits or characters, each decimal digit or character being comprised of a predetermined number of bits, the account number of each account being the address of the account in said cyclic memory means;
    read means for cyclically reading the account numbers and applying the account numbers to a buss;
    a plurality of comparator storage means connected to said buss for simultaneously receiving the account number being read by said read means, each of said plurality of comparator storage means being operative to store a complete account number;
    a plurality of input storage means for receiving account numbers from a plurality of remote sources, each of said plurality of input storage means being operative to store a complete account number;
    a plurality of account number comparators, the number of comparator storage means, input storage means and account number comparators being equal, each account number comparator being provided with a predetermined number of stages sufficient to compare all of the bits of an account number, each of said account number comparators being provided with a first and second set of input terminals and an output terminal, said first set of input terminals of each of said account number comparators being connected to one of said plurality of comparator storage means, said second set of input terminals of each of said account number comparators being connected to one of said plurality of input storage means, each of said account number comparators generating a coincidence signal on said output terminal in response to the detection of coincidence between account numbers on said first and second sets of input terminals, and means responsive to the generation of a coincidence signal.

2. A memory system in accordance with claim 1 wherein said cyclic memory means comprises a drum memory.

3. A memory system in accordance with claim 1 wherein said means responsive to the generation of a coincidence signal includes a logic unit.

4 A memory system in accordance with claim 1 wherein said means responsive to the generation of a coincidence signal includes an arithmetic unit controlled by a logic unit.

5. A memory system in accordance with claim 1 including a further processing temporary storage means, said further processing temporary storage means being controlled by a gate, said gate being responsive to the generation of a coincidence signal of one of said plurality of account number comparators, whereby information stored in said cyclic memory means is entered into said temporary storage means.

6. A memory system in accordance with claim 5 including a logic unit for further processing of the information stored in said temporary storage means.

7. A memory system in accordance with claim 1 wherein said plurality of remote sources include terminals provided with means for reading indicia on physical records and means for inputting a secret code, said secret code being comprised of predetermined information previously provided to an authorized physical record holder.

8. A memory system in accordance with claim 7 wherein said means for reading indicia on physical records comprises credit card reading means.

9. A memory system in accordance with claim 7 wherein said means for inputting a secret code comprises keyboard means.

10. A memory system in accordance with claim 7 wherein said information stored in said cyclic memory comprises a record of the indicia on said physical record and an associated secret code.

11. A memory system in accordance with claim 10 wherein said record of the indicia on said physical records stored in said cyclic memory comprises said account number and the address of said information stored in said cyclic memory.

12. A memory system in accordance with claim 10 including a plurality of secret code comparator means for detecting coincidence between the secret code from said plurality of remote terminals and the associated secret codes stored in said cyclic memory.

13. A memory system in accordance with claim 12 including means for detecting a predetermined number of times of attempted detection of coincidence and failure to detect coincidence between the secret code from said plurality of remote terminals and the associated secret code stored in said cyclic memory.

14. A memory system in accordance with claim 13 wherein said detection means provides an indication to an inquiring remote terminal in response to detection of a predetermined number of times of failure to detect coincidence.

15. A memory system, comprising:
a cyclic memory means for storing information relating to a plurality of accounts, each acunt being assigned an account number or identification word comprised of a predetermined number of alphanumeric characters, each alphanumeric character being comprised of a predetermined number of bits, the account number of each account being the address of the account in said cyclic memory means;
read means for cyclically reading the account numbers and applying the account numbers to a buss;

a plurality of input storage means for receiving account numbers from a plurality of remote sources, each of said plurality of input storage means being operative to store a complete account number;
a plurality of account number comparators, the number of input storage means and account number comparators being equal, each account number comparator being provided with a predetermined number of stages sufficient to compare all of the bits of an account number, each of said account number comparators being provided with a first and second set of input terminals and an output terminal, said first set of input terminals of each of said account number comparators being connected to said buss, said second set of input terminals of each of said account number comparators being connected to one of said plurality of input storage means, each of said account number comparators generating a coincidence signal on said output terminal in response to the detection of coincidence between account numbers on said first and second sets of input terminals; and means responsive to the generation of a coincidence signal.

16. A memory system in accordance with claim 15 wherein said cyclic memory means comprises a drum memory.

17. A memory system in accordance with claim 15 wherein said means responsive to the generation of a coincidence signal includes a logic unit.

18. A memory system in accordance with claim 15 wherein said means responsive to the generation of a coincidence signal includes an arithmetic unit controlled by a logic unit.

19. A memory system in accordance with claim 15 including a further processing temporary storage means, said further processing temporary storage means being controlled by a gate, said gate being responsive to the generation of a coincidence signal of one of said plurality of account number comparators, whereby information stored in said cyclic memory means is entered into said temporary storage means.

20. A memory system in accordance with claim 19 including a logic unit for further processing of the information stored in said temporary storage means.

21. A memory system in accordance with claim 15 wherein said plurality of remote sources include terminals provided with means for reading indicia on physical records and means for inputting a secret code, said secret code being comprised of predetermined information previously provided to an authorized physical record holder.

22. A memory system in accordance with claim 21 wherein said means for reading indicia on physical records comprises credit card reading means.

23. A memory system in accordance with claim 21 wherein said means for inputting a secret code comprises keyboard means.

24. A memory system in accordance with claim 21 wherein said information stored in said cyclic memory comprises a record of the indicia on said physical record and an associated secret code.

25. A memory system in accordance with claim 24 wherein said record of the indicia on said physical records stored in said cyclic memory comprises said account number and the address of said information stored in said cyclic memory.

26. A memory system in accordance with claim 24 including a plurality of secret code comparator means for detecting coincidence between the secret code from said plurality of remote terminals and the associated secret codes stored in said cyclic memory.

27. A memory system in accordance with claim 26 including means for detecting a predetermined number of times of attempted detection of coincidence and failure to detect coincidence between the secret code from said plurality of remote terminals and the associated secret code stored in said cyclic memory.

28. A memory system in accordance with claim 27 wherein said detection means provides an indication to an inquiring remote terminal in response to detection of a predetermined number of times of failure to detect coincidence.

29. A memory system comprising a cyclic memory and means for continuously reading out the information stored in said memory, said information including a record of indicia on a physical record and an associated secret code, a plurality of means each being connected to said read means for simultaneously temporarily storing the information read out from said memory, a plurality of means for temporarily storing information communicated to said memory system from a plurality of remote terminals, each of said plurality of remote terminals being provided with means for reading indicia on physical records and means for inputting a secret code, a plurality of coincidence means for determining coincidence between the information temporarily stored in said means for temporarily storing information communicated from said memory, and the information temporarily stored in said means for temporarily storing information communicated to said memory system, means responsive to the detection of said coincidence including a plurality of secret code comparator means for detecting coincidence between the secret code from said plurality of remote terminals and associated secret code stored in said cyclic memory, and means for detecting a predetermined number of times of attempted detection of coincidence and failure to detect coincidence between the secret code from said plurality of remote terminals and the associated secret code stored in said cyclic memory.

30. A memory system in accordance with claim 29 wherein said detection means provides an indication to an inquiring remote terminal in response to detection of a predetermined number of times of failure to detect coincidence.

* * * * *